United States Patent
Koh et al.

(10) Patent No.: US 7,846,587 B2
(45) Date of Patent: Dec. 7, 2010

(54) ION CONDUCTOR

(75) Inventors: Meiten Koh, Settsu (JP); Akiyoshi Yamauchi, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 640 days.

(21) Appl. No.: 11/664,538

(22) PCT Filed: Oct. 6, 2005

(86) PCT No.: PCT/JP2005/018542

§ 371 (c)(1),
(2), (4) Date: Apr. 3, 2007

(87) PCT Pub. No.: WO2006/041008

PCT Pub. Date: Apr. 20, 2006

(65) Prior Publication Data

US 2008/0020275 A1    Jan. 24, 2008

(30) Foreign Application Priority Data

Oct. 15, 2004    (JP)    ............... 2004-301934

(51) Int. Cl.
*H01M 6/18*    (2006.01)
(52) U.S. Cl. ................ 429/316; 429/189; 429/314
(58) Field of Classification Search ................ 429/189, 429/314, 316
See application file for complete search history.

(56) References Cited

U.S. PATENT DOCUMENTS

| 6,100,324 | A  |   | 8/2000 | Choi et al. |
|-----------|----|---|--------|-------------|
| 6,287,722 | B1 | * | 9/2001 | Barton et al. ............... 429/176 |

FOREIGN PATENT DOCUMENTS

| JP | 9-48832 A | 2/1997 |
|----|-----------|--------|
| JP | 2000-234020 A | 8/2000 |
| JP | 2003-7337 A | 1/2003 |
| JP | 2004-51978 A | 2/2004 |
| WO | WO 99/52954 A1 | 10/1999 |
| WO | WO 99/59216 A1 | 11/1999 |
| WO | WO 00/52085 A1 | 9/2000 |
| WO | WO 2004/059664 A1 | 7/2004 |

* cited by examiner

*Primary Examiner*—Melvin C Mayes
*Assistant Examiner*—Melissa Stalder
(74) *Attorney, Agent, or Firm*—Sughrue Mion, PLLC

(57) ABSTRACT

There is provided a high molecular weight ion conductor which has a high ionic conductivity even around room temperature, is low in a viscosity, is nonflammable, is excellent in oxidation resistance, and can satisfy characteristics required for a solid electrolyte of lithium secondary batteries, a solid electrolyte of capacitors and a solid electrolyte of solar cells. The high molecular weight ion conductor comprises an ion conducting compound (I) and an electrolytic salt (II), and the ion conducting compound (I) is a non-crystalline fluorine-containing polyether compound having a fluorine-containing group in its side chain and a unit dissolving an electrolyte, or a crosslinked product thereof.

15 Claims, No Drawings

ION CONDUCTOR

TECHNICAL FIELD

The present invention relates to an ion conductor comprising a non-crystalline fluorine-containing polyether compound having a fluoroether group in its side chain. The ion conductor is useful as high molecular weight electrolytes for lithium secondary batteries, solar cells, capacitors, etc.

BACKGROUND ART

At the present time, organic molecular compounds are mainly used for lithium secondary batteries, solar cells and capacitors. From the point of avoiding leakage of an electrolytic solution, technical development is moving toward high molecular weight electrolytes.

Known as such high molecular weight electrolytes are those prepared in combination of a polymer containing an ethylene oxide (EO) unit with an electrolytic salt (metal salt) and those prepared in combination of a polymer containing an ethylene oxide (EO) unit and an electrolytic salt with an organic solvent.

However EO-electrolytic salt-based ion conductors have essential problems such that because a viscosity thereof is high, transfer of dissociated ions is not smooth, and because the electrolytic salt is dissolved in a poly phase crystalline polymer, an ionic conductivity is affected by a phase change, particularly by melting of an EO crystal phase, resulting in a low ionic conductivity at a temperature near room temperature, and further because a crystallization speed is slow, an ionic conductivity changes as time elapses.

Accordingly, in order to decrease a viscosity and also to increase an ionic conductivity at a temperature near room temperature, various trials for enhancing non-crystallinity have been made by changing kind of polyethers. As a result, dependency on temperature is considerably reduced, but actually an ionic conductivity is not so enhanced and is not in a practical level.

As a trial for decreasing a viscosity, it is proposed to introduce bulky $CF_3$ group to EO. For example, JP-A-8-22270 proposes an ion conductor which comprises a fluorine-containing polyether compound comprising a unit of:

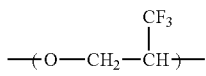

and a unit of:

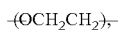

an alkali metal salt and an organic solvent.

Also JP-A-9-48832 discloses an ion conductor comprising a crosslinked diacrylate containing a fluorine-containing polyether represented by:

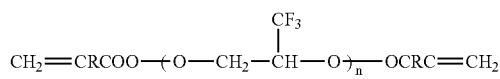

where n is from 10 to 20, a metal salt and an organic solvent.

Further JP-A-11-53937 proposes to use a copolymer comprising a fluoroolefin unit and an alkyl vinyl ether or alkyl allyl ether unit having a carbonate bond.

Additionally use of a compound containing a polyfluoroether unit in its trunk chain as an ion conductor is disclosed in JP-A-2003-257240.

However in any of the compounds containing a fluorine-containing ether unit which are disclosed in those Patent Documents, a large ionic conductivity can be obtained only by gelation with an organic solvent because an action of decreasing a viscosity is insufficient.

DISCLOSURE OF INVENTION

It is an object of the present invention to provide an ion conductor which can achieve an ionic conductivity larger than that of the above described conventional ion conductors.

The present inventors have found an ion conductor which can obtain $10 \times^{-6}$ S/cm even in a state of containing no organic solvent by introducing a fluoroether unit and a fluorine-containing alkyl group in a side chain of an EO unit and combining the ion conductor having a unit for enhancing solubility of an electrolytic salt with the electrolytic salt, and thus have completed the present invention.

Namely, the present invention relates to an ion conductor comprising an ion conducting compound (I) and an electrolytic salt (II), and the ion conducting compound (I) is a non-crystalline fluorine-containing polyether compound having a fluorine-containing group in its side chain or a crosslinked product thereof and is represented by the formula (1):

$$A\text{-}(D)\text{-}B \tag{1}$$

wherein D is represented by the formula (2):

$$\text{-}(D1)_n\text{-}(FAE)_m\text{-}(AE)_p\text{-}(Y)_q\text{-} \tag{2}$$

where D1 is an ether unit having a fluoroether group in its side chain and represented by the formula (2a):

(2a)

where Rf is a fluoroether group which may have a crosslinkable functional group; $R^1$ is a group or bond bonding Rf to a trunk chain; FAE is an ether unit having a fluorine-containing alkyl group in its side chain and represented by the formula (2b):

(2b)

where Rfa is a fluorine-containing alkyl group which may have a crosslinkable functional group; $R^1$ is a group or bond bonding Rfa to the trunk chain;

AE is an ether unit represented by the formula (2c):

(2c)

where R is hydrogen atom, an alkyl group which may have a crosslinkable functional group, an aliphatic cyclic hydrocarbon group which may have a crosslinkable functional group or an aromatic hydrocarbon group which may have a crosslinkable functional group;

$R^1$ is a group or bond bonding R to the trunk chain;

Y is a unit having at least one of the formulae (2d-1) to (2d-3):

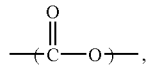   (2d-1)

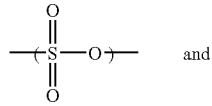 and   (2d-2)

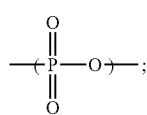;   (2d-3)

n is 0 or an integer of 1 to 200; m is 0 or an integer of 1 to 200; p is 0 or an integer of 1 to 10,000; q is an integer of 1 to 100; n+m is not 0, and the order of bonding of D1, FAE, AE and Y is not specified;

A and B are the same or different and each is hydrogen atom, an alkyl group which may have fluorine atom and/or a crosslinkable functional group, a phenyl group which may have fluorine atom and/or a crosslinkable functional group, a —COOH group, —$OR^2$ where $R^2$ is hydrogen atom or an alkyl group which may have fluorine atom and/or a crosslinkable functional group, an ester group or a carbonate group (when an end of D is oxygen atom, A and B are not a —COOH group, —$OR^2$, an ester group and a carbonate group).

BEST MODE FOR CARRYING OUT THE INVENTION

The ion conductor of the present invention comprises the specific ion conducting compound (I) and the electrolytic salt (II).

The specific ion conducting compound (I) used in the present invention is a non-crystalline fluorine-containing polyether compound which has a fluorine-containing group in its side chain and is represented by the formula (1):

A-(D)-B   (1)

wherein D is represented by the formula (2):

-(D1)$_n$-(FAE)$_m$-(AE)$_p$-(Y)$_q$—   (2)

where D1 is a an ether unit having a fluoroether group in its side chain and represented by the formula (2a):

   (2a)

where Rf is a fluoroether group which may have a crosslinkable functional group; $R^1$ is a group or bond bonding Rf to the trunk chain; FAE is an ether unit having a fluorine-containing alkyl group in its side chain and represented by the formula (2b):

   (2b)

where Rfa is a fluorine-containing alkyl group which may have a crosslinkable functional group; $R^1$ is a group or bond bonding Rfa to the trunk chain;

AE is an ether unit represented by the formula (2c):

   (2c)

where R is hydrogen atom, an alkyl group which may have a crosslinkable functional group, an aliphatic cyclic hydrocarbon group which may have a crosslinkable functional group or an aromatic hydrocarbon group which may have a crosslinkable functional group;

$R^1$ is a group or bond bonding R to the trunk chain;

Y is a unit having at least one of the formulae (2d-1) to (2d-3):

   (2d-1)

 and   (2d-2)

;   (2d-3)

n is 0 or an integer of 1 to 200; m is 0 or an integer of 1 to 200; p is 0 or an integer of 1 to 10,000; q is an integer of 1 to 100; n+m is not 0, and the order of bonding of D1, FAE, AE and Y is not specified;

A and B are the same or different and each is hydrogen atom, an alkyl group which may have fluorine atom and/or a crosslinkable functional group, a phenyl group which may have fluorine atom and/or a crosslinkable functional group, a —COOH group, —$OR^2$ where $R^2$ is hydrogen atom or an alkyl group which may have fluorine atom and/or a crosslinkable functional group, an ester group or a carbonate group (when an end of D is oxygen atom, A and B are not a —COOH group, —$OR^2$, an ester group and a carbonate group).

In this non-crystalline fluorine-containing polyether compound (1) having a fluorine-containing group in its side chain, non-crystallinity of the compound is enhanced and a viscosity of the compound is decreased by introducing a fluoroether side chain and/or a fluorine-containing alkyl group to a conventional ethylene oxide (EO) unit, and further an ability of holding an electrolyte can be enhanced by introducing a unit for enhancing solubility of the electrolyte.

Further the fluoroether group Rf and the fluorine-containing alkyl group Rfa are excellent in oxidation resistance and are nonflammable, and therefore an excellent stability is exhibited in the case of use at high temperature.

The unit Y to be introduced as a unit for highly dissolving the electrolyte is a unit containing the carbonate portion, the sulfonate portion and/or the phosphonate portion represented by the formulae (2d-1), (2d-2) or (2d-3), respectively.

Examples of the units containing the formula (2d-1):

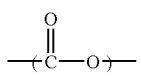
(2d-1)

are, for instance,
the formula (2d-1-1):

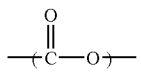

and additionally,
the formula (2d-1-2):

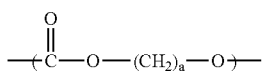

where a is an integer of 1 to 4.

Example of the formula (2d-1-1) is:

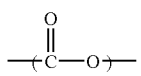

obtained by copolymerization with carbon dioxide, and examples of the formula (2d-1-2) are:

obtained by ring-opening polymerization of:

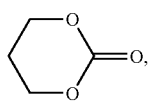 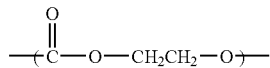

obtained by ring-opening polymerization with ethylene carbonate,

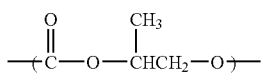

obtained by ring-opening polymerization with propylene carbonate,

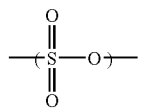

obtained by condensation reaction with diethyl carbonate, and the like

Examples of the unit containing the formula (2d-2):

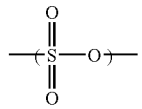
(2d-2)

are, for instance:

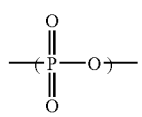

obtained by polycondensation reaction with $SO_2$ and

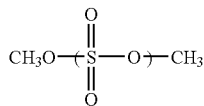

and the like.

Examples of the unit containing the formula (2d-3):

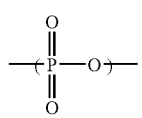
(2d-3)

are, for instance:

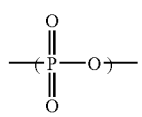

obtained by polycondensation reaction with $POCl_3$ and

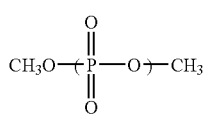

and the like.

Of these units, preferable are units containing the formula (2d-1) from the viewpoint of cost and excellent reactivity, thermal stability and low hydrolyzability, and specifically:

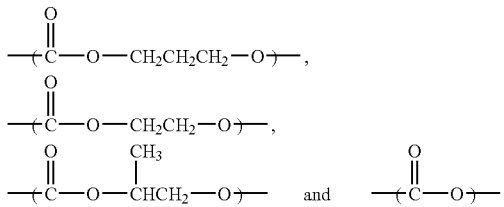

are preferable.

The unit D1 having a fluoroether group which is represented by the formula (2a) is an optional unit, and at least either of this unit D1 or the ether unit FAE having a fluorine-containing alkyl group is contained in the ion conducting compound.

In the formula (2a), preferable examples of —Rf are groups represented by the formula (2a-1):

$$—Rf^1—X \qquad (2a\text{-}1)$$

wherein —$Rf^1$- is a fluoroether unit having at least one kind selected from the group consisting of —$(OCF_2CF_2CF_2)_{n1}$—, —$(CF_2CF_2CF_2O)_{n1}$—, —$(OCFZ^1CF_2)_{n1}$—, —$(OCF_2CFZ^1)_{n1}$—, —$(OCFZ^2)_{n1}$—, —$(CFZ^2O)_{n1}$—, —$(OCH_2CF_2CF_2)_{n1}$—, —$(OCF_2CF_2CH_2)_{n1}$—, —$(OCH_2CH_2CF_2)_{n1}$—, —$(OCF_2CH_2CH_2)_{n1}$—, —$(OCF_2CF_2CF_2CF_2)_{n1}$—, —$(CF_2CF_2CF_2CF_2O)_{n1}$—, —$(OCFZ^2CH_2)_{n1}$—, —$(CH_2CFZ^2O)_{n1}$—, —$(OCH(CH_3)CF_2CF_2)_{n1}$—, —$(OCF_2CF_2CH(CH_3))_{n1}$—, $(CFZ^1CF_2O)_{n1}$—, —$(CH_2CF_2CF_2O)_{n1}$—, —$(OCZ^3{}_2)_{n1}$— and —$(CZ^3{}_2O)_{n1}$— where $Z^1$ and $Z^2$ may be the same or different and each is H, F or $CF_3$; $Z^3$ is $CF_3$; n1 is an integer of 1 to 3; X is at least one kind selected from hydrogen atom, halogen atom or a fluorine-containing alkyl group which has 1 to 20 carbon atoms and may have an ether bond and/or a crosslinkable functional group, and X does not have the above-mentioned $Rf^1$ and a —O—O— structure is not contained in the $Rf^1$.

Specifically —$Rf^1$- is preferably one or two or more kinds of repeat units selected from —$(OCFZ^1CF_2)_{n1}$—, —$(OCF_2CF_2CF_2)_{n1}$—, —$(OCH_2CF_2CF_2)_{n1}$—, —$(OCFZ^2)_{n1}$-, —$(OCZ^3{}_2)_{n1}$-, —$(CFZ^1CF_2O)_{n1}$—, —$(CF_2CF_2CF_2O)_{n1}$—, —$(CH_2CF_2CF_2O)_{n1}$—, —$(CFZ^2O)_{n1}$— and —$(CZ^3{}_2O)_{n1}$—, and particularly preferably one or two or more kinds of repeat units selected from —$(OCFZ^1CF_2)_{n1}$—, —$(OCF_2CF_2CF_2)_{n1}$—, —$(OCH_2CF_2CF_2)_{n1}$—, —$(CFZ^1CF_2O)_{n1}$—, —$(CF_2CF_2CF_2O)_{n1}$— and —$(CH_2CF_2CF_2O)_{n1}$—, further preferably one or two or more kinds of repeat units selected from —$(OCFZ^1CF_2)_{n1}$—, —$(OCF_2CF_2CF_2)_{n1}$—, —$(CFZ^1CF_2O)_{n1}$— and —$(CF_2CF_2CF_2O)_{n1}$—.

Since the fluoroether group tends to decrease a dielectric constant, smaller n1 is preferable.

Suitable examples thereof are, for instance, —$(OCF_2CF_2)$—, —$(OCF_2CF_2CF_2)$—, —$(OCF_2)$—, —$(OCH_2CF_2CF_2)$—, —$(OCF(CF_3)CF_2)$—, —$(OCF(CF_3))$—, —$(C(CF_3)_2O)$—, —$(OCFHCF_2)$—, —$(OCFH)$—, —$(CF_2CF_2O)$—, —$(CF_2CF_2CF_2O)$—, —$(CF_2O)$—, —$(CH_2CF_2CF_2O)$—, —$(CF(CF_3)CF_2O)$—, —$(CF(CF_3)O)$—, —$(OC(CF_3)_2)$—, —$(CFHCF_2O)$—, —$(CFHO)$—and the like, and from the viewpoint of excellent thermal stability and oxidation resistance and easy synthesis, specifically preferable are —$(OCF_2CF_2)$—, —$(OCF_2CF_2CF_2)$—, —$(OCF_2)$—, —$(OCH_2CF_2CF_2)$—, —$(OCF(CF_3)CF_2)$—, —$(OCF(CF_3))$—, —$(CF_2CF_2O)$—, —$(CF_2CF_2CF_2O)$—, —$(CF_2O)$—, —$(CH_2CF_2CF_2O)$—, —$(CF(CF_3)CF_2O)$—and —$(CF(CF_3)O)$—.

Also X is at least one selected from hydrogen atom, halogen atom or a fluorine-containing alkyl group which has 1 to 20 carbon atoms and may have an ether bond and/or a crosslinkable functional group, and is characterized in that X does not have the above-mentioned $Rf^1$ and a —O—O— structure is not contained in the $Rf^1$. Examples thereof are H, F, —$CH_2OH$, —$CH=CH_2$, —$CH_2CH=CH_2$, —$COOCH_3$, —$COOH$, —$CONH_2$, —$CON(CH_3)_2$,

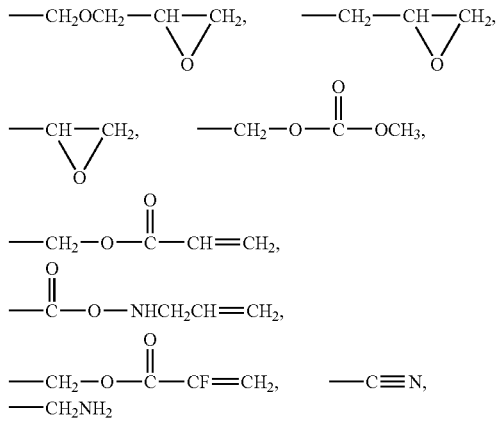

and the like. Among them, from the viewpoint of excellent crosslinkability and enhancement of a dielectric constant, —$CH_2OH$,

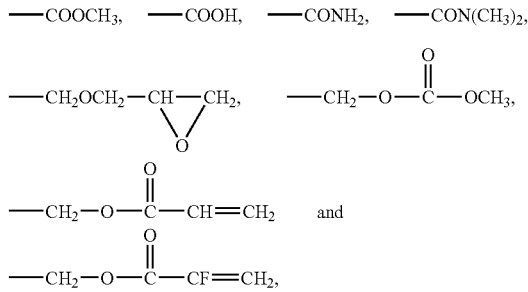

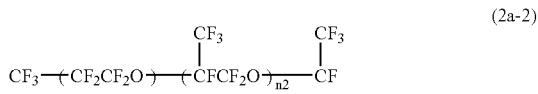

are preferable.

Example of preferable —Rf in the formula (2a) is a fluoroether group represented by the formula (2a-2):

wherein n2 is 0 or an integer of 1 or 2. This group is preferable because synthesis is easy, cost is low and a viscosity can be decreased by the introduction of branched $CF_3$.

In the above-mentioned formulae (2a), (2b) and (2c), $R^1$ bonding the trunk chain to Rf, Rfa or R is preferably a bonding group represented by the formula:

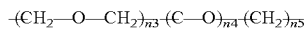

wherein n3 is 0 or 1, n4 is 0 or 1, n5 is 0 or an integer of 1 or 2.

Preferable $R^1$ are as follows (represented by Rf).

(i) Direct Bonding Type

In this type, n3=n4=n5=0 and $R^1$ is a bond.

(ii) Alkylene Type

—$(CH_2)_{m1}$—Rf (m1 is an integer of 1 to 3)

(iii) Ether Type

—$CH_2$—O—$CH_2$—Rf or —$CH_2$—O—$CH_2$—$(CH_2)_{m2}$—Rf (m2 is an integer of 1 to 5)

(iv) Ester Type

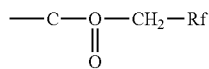

Next, suitable examples of D1 are, for instance, (i) Direct Bonding Type:
for example, the formula (2a-2-1):

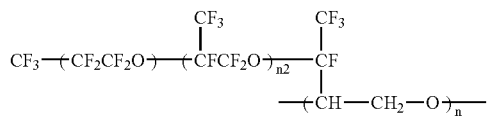

where n2 is as defined above, n is an integer of 1 to 200.

(ii) Alkylene Type:
for example, the formula (2a-2-2):

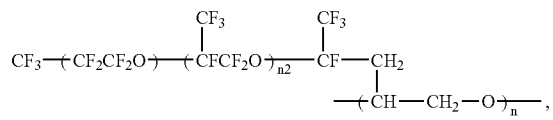

the formula (2a-2-3):

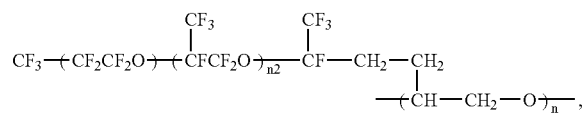

where n2 is as defined above, n is an integer of 1 to 200.

(iii) Ether Type:
for example, the formula (2a-2-4):

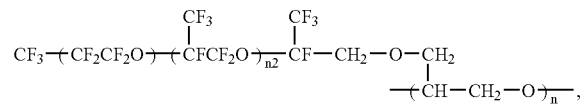

the formula (2a-2-5):

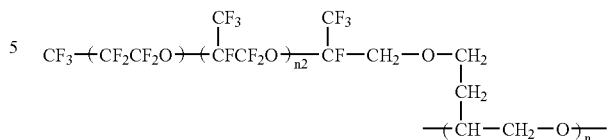

where n2 is as defined above, n is an integer of 1 to 200.

(iv) Ester Type:
for example, the formula (2a-2-6):

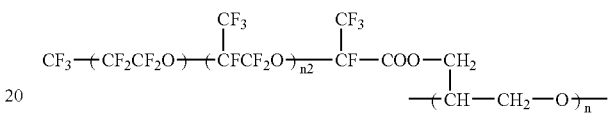

where n2 is as defined above, n is an integer of 1 to 200.

In these, from the viewpoint of excellent reactivity and easy synthesis, preferable examples of Rf-$R^1$— are:

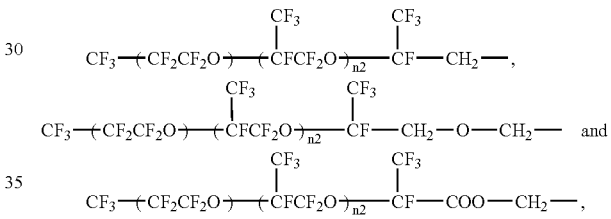

where n2 is as defined above.

The unit FAE having a fluorine-containing alkyl group and represented by the formula (2b) is an optional unit, and at least either of the FAE unit and the ether unit D1 having a fluoroether group is contained without fail.

By the introduction of the unit FAE having a fluorine-containing alkyl group, a mechanical strength, oxidation resistance, thermal stability, copolymerizability and the like are improved.

In the formula (2b), Rfa is a fluorine-containing alkyl group which may have a crosslinkable functional group or a fluorine-containing linear or branched alkyl group which has 1 to 20 carbon atoms and may have a crosslinkable functional group.

Preferable examples of the crosslinkable functional group are X (H and F are excluded) in the above described formula (2a-1) and preferable examples thereof.

Rfa are preferably linear or branched perfluoroalkyl groups ($Rfa^1$) having 1 to 10 carbon atoms such as —$CF_3$, —$C_2F_5$, —$C_3F_7$ or —$C_4F_9$, and ω$Rfa^1$ that is a group in which ω atom of $Rfa^1$ is hydrogen atom such as —$CF_2H$, —$CF_2CF_2H$ or —$(CF_2CF_2)_2H$. Examples thereof are fluorine-containing alkyl groups in which at least one of fluorine atoms or hydrogen atom is replaced by the above described crosslinkable functional group.

Also in the formula (2b), as a type of bond to the trunk chain by $R^1$, the above described four types can be adopted.

Next, suitable examples of FAE are, for instance, (i) Direct Bonding Type:
for example, the formula (2b-1-1):

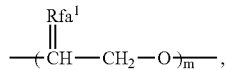

the formula (2b-1-2):

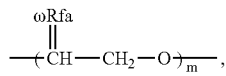

where m is an integer of 1 to 200.

(ii) Alkylene Type:
for example, the formula (2b-2-1):

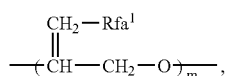

the formula (2b-2-2):

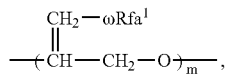

the formula (2b-2-3):

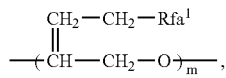

the formula (2b-2-4):

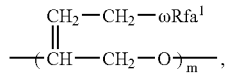

where m is an integer of 1 to 200.

(iii) Ether Type
for example, the formula (2b-3-1):

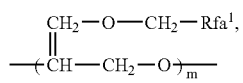

the formula (2b-3-2):

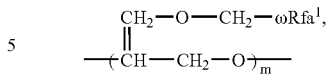

where m is an integer of 1 to 200.

(iv) Ester Type
for example, the formula (2b-4-1):

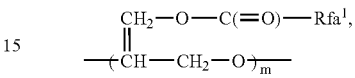

the formula (2b-4-2):

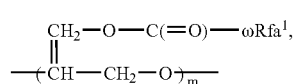

where m is an integer of 1 to 200.

The ether unit AE represented by the formula (2c) is an optional unit. By the introduction of this ether unit AE, a strength, solubility of the electrolyte and the like can be improved.

In the formula (2c), R is hydrogen atom, an alkyl group which may have a crosslinkable functional group, an aliphatic cyclic hydrocarbon group which may have a crosslinkable functional group, or an aromatic hydrocarbon group which may have a crosslinkable functional group.

Preferable examples of the alkyl group are linear or branched alkyl groups having 1 to 20 carbon atoms, for example, methyl and ethyl.

Preferable examples of the aliphatic cyclic hydrocarbon group are cycloalkyl groups having 4 to 8 carbon atoms, for example, cyclopentyl and cyclohexyl.

Preferable examples of the aromatic hydrocarbon group are, for instance, phenyl, benzyl and the like.

Preferable examples of the crosslinkable functional group which may be introduced in those groups as a substituent are X (H, F and a fluorine-containing group are excluded) in the above described formula (2a-1) and preferable examples thereof.

Preferable examples of R are linear or branched alkyl groups having 1 to 20 carbon atoms from the viewpoint of excellent polymerizability, strength and solubility of the electrolyte, and methyl and ethyl are particularly preferable.

Additionally also in the formula (2c), as a type of bond to the trunk chain by $R^1$, the above described four types can be adopted, and particularly preferable are a direct bonding type and an ether type.

Next, suitable examples of AE are, for instance,
(i) Direct Bonding Type:
for example, the formula (2c-1):

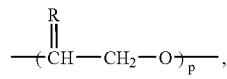

where p is an integer of 1 to 10,000.

(ii) Alkylene Type:

This type is included in the direct bonding type (i).

(iii) Ether Type:
for example, the formula (2c-2):

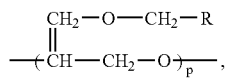

where p is an integer of 1 to 10,000.

(iv) Ester Type:
for example, the formula (2c-3):

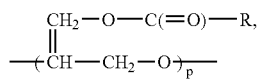

where p is an integer of 1 to 10,000.

Examples thereof are, for instance,

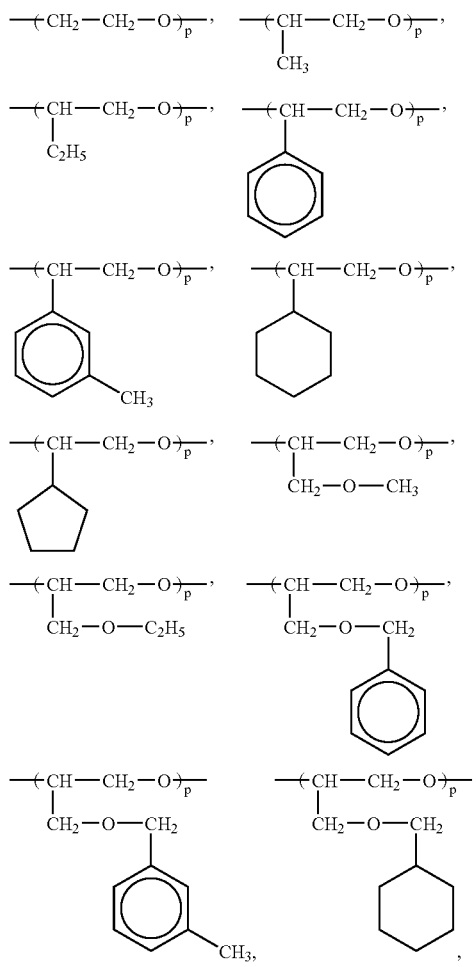

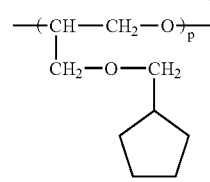

and the like.

In the non-crystalline fluorine-containing polyether compound (1) having, in its side chain, a fluoroether group which is used in the present invention, A and B are the same or different and each is hydrogen atom, an alkyl group which may have fluorine atom and/or a crosslinkable functional group, particularly an alkyl group which has 1 to 10 carbon atoms and may have fluorine atom and/or a crosslinkable functional group, a phenyl group which may have fluorine atom and/or a crosslinkable functional group, a —COOH group, —$OR^2$ where $R^2$ is hydrogen atom, an alkyl group which may have fluorine atom and/or a crosslinkable functional group, particularly an alkyl group which has 1 to 10 carbon atoms and may have fluorine atom and/or a crosslinkable functional group, an ester group or a carbonate group. When an end of D is oxygen atom, A and B are not a —COOH group, —$OR^2$, an ester group and a carbonate group.

Preferable examples of A are, for instance,

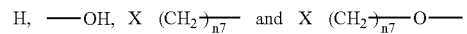

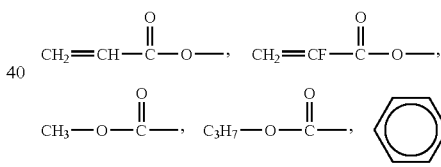

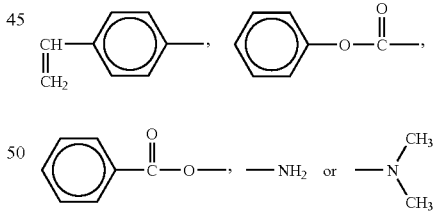

where n7 is an integer of 1 to 10, and from the viewpoint of crosslinking reactivity and enhancement of a dielectric constant, preferable is:

$X(CH_2)_{n8}$ or $X(CH_2)_{n8}O$—,

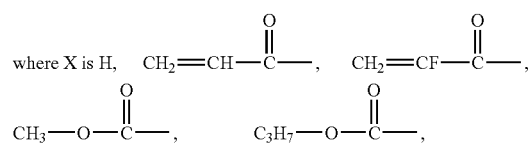

-continued

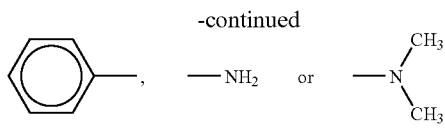

wherein n8 is an integer of 1 to 5.

Preferable examples of B are, for instance,

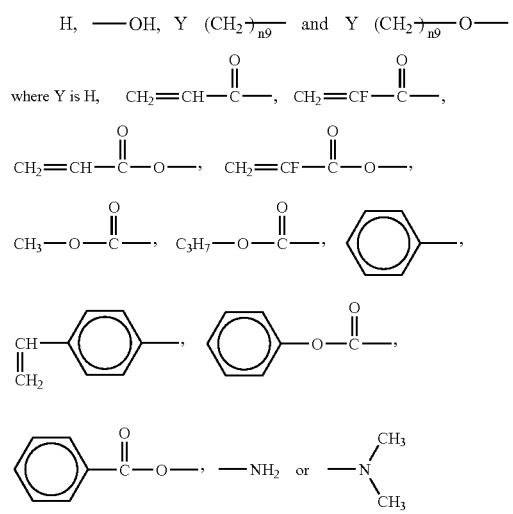

where n9 is an integer of 1 to 10, and from the viewpoint of crosslinking reactivity and enhancement of a dielectric constant, preferable is:
$Y(CH_2)_{\overline{n}10}$ or $Y(CH_2)_{\overline{n}10}O$—,

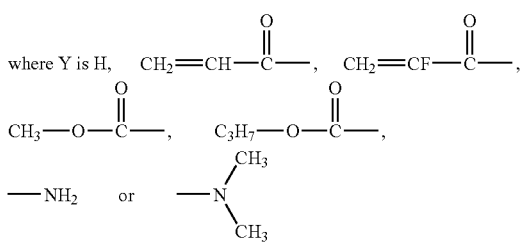

wherein n10 is an integer of 1 to 5.

In the non-crystalline fluorine-containing polyether compound (1) having a fluorine-containing group in its side chain, the proportions of each unit (percentages of n, m, p and q, assuming that n+m+p+q is 100) are preferably n=0.1 to 90%, m=10 to 90%, p=10 to 99%, and q=10 to 90%.

Then the following compounds are raised as the examples of the non-crystalline fluorine-containing polyether compound having a fluorine-containing group in its side chain which is represented by the formula (1), in view of a combination of the units thereof.

(1a) Combination of the Unit D1 and the Unit Y

This combination is excellent because both of decrease in a viscosity and enhancement of a dielectric constant can be achieved. The ratio of n/q is preferably 90/10 to 10/90, particularly 80/20 to 20/80 from the viewpoint of enhancement of a dielectric constant.

Specifically the compounds thereof are, for example, combinations of six kinds of D1 of the above-mentioned formulae (2a-2-1) to (2a-2-6) and two kinds of Y of the above-mentioned formulae (2d-1-1) and (2d-1-2).

(1b) Combination of the Unit D1, the Unit AE and the Unit Y

This combination is excellent from the viewpoint of enhancement of a mechanical strength and enhancement of solubility of an electrolyte. The ratio of n/q is preferably 99/1 to 1/99, and the ratio of (n+q)/p is preferably 0.1/99.9 to 90/10.

Specifically the compounds thereof are, for example, combinations of six kinds of D1 raised in (1a) above, three kinds of AE of the above-mentioned formulae (2c-1) to (2c-3) and the above-mentioned two kinds of Y.

(1c) Combination of the Unit FAE and the Unit Y

This combination is excellent from the viewpoint of enhancement of a mechanical strength, oxidation resistance and a dielectric constant. The ratio of m/q is preferably 90/10 to 10/90, particularly 80/20 to 20/80 from the viewpoint of enhancement of a mechanical strength.

Specifically the compounds thereof are, for example, combinations of eight kinds of FAE of the above-mentioned formulae (2b-1-1) to (2b-4-2) and the above-mentioned two kinds of Y.

(1d) Combination of the Unit FAE, the Unit AE and the Unit Y

This combination is excellent from the viewpoint of enhancement of a mechanical strength and oxidation resistance. The ratio of m/q is preferably 90/10 to 10/90, particularly 80/20 to 20/80, and the ratio of (m+q)/p is preferably 0.1/99.9 to 50/50, particularly 1/99 to 40/60 from the viewpoint of enhancement of a mechanical strength.

Specifically the compounds thereof are, for example, combinations of the above-mentioned eight kinds of FAE, the above-mentioned three kinds of AE and the above-mentioned two kinds of Y.

(1e) Combination of the Unit D1, the Unit FAE, the Unit AE and the Unit Y

This combination is excellent from the viewpoint of decrease in a viscosity and enhancement of a mechanical strength and oxidation resistance. The ratio of n/m/q is preferably 1/1/90 to 70/20/10, and the ratio of (n+m+q)/p is preferably 0.1/99.9 to 90/10 from the viewpoint of enhancement of a mechanical strength.

Specifically the compounds thereof are, for example, combinations of the above-mentioned six kinds of D1, the above-mentioned eight kinds of FAE, the above-mentioned three kinds of AE and the above-mentioned two kinds of Y.

A number average molecular weight of the non-crystalline fluorine-containing polyether compound (1) having a fluorine-containing group in its side chain is preferably not less than 500, further not less than 1,000, particularly not less than 1,500 from the point that a mechanical strength can be enhanced. It is preferable that an upper limit thereof is 100,000, further 80,000, particularly 50,000 from the point that solubility of an electrolyte can be enhanced.

The non-crystalline fluorine-containing polyether compound (1) having a fluorine-containing group in its side chain which is used in the present invention can be prepared, for example, by an anionic polymerization reaction using, as an initiator, anions such as $O^-$, $C^-$ and $N^-$; a cationic polymerization reaction using, as an initiator, a Lewis acid and a Brønsted acid; an anionic polymerization reaction or a cationic polymerization reaction using, as an initiator, a low molecular weight polymer containing the above-mentioned D1, FAE, AE or a derivative thereof; a polycondensation reaction or a polyaddition reaction using, as a precursor, a low molecular weight polymer containing the above-mentioned D1, FAE, AE or a derivative thereof.

In the present invention, the solid ion-conducting compound (I) may be a crosslinked product. The crosslinked product can be prepared by introducing a crosslinkable functional group to the non-crystalline fluorine-containing polyether compound (1) having a fluoroether group in its side chain and as case demands, by crosslinking using a crosslinking agent. By using the crosslinked product, a mechanical strength of the ion conductor is remarkably enhanced.

Examples of the crosslinkable functional group are, for instance, a vinyl group, an acryl group, a glycidyl group, an epoxy group, a hydroxyl group, a carboxyl group, an acryloyl group, a cyano group, an alkoxysilyl group and the like which may be introduced to A and/or B of the formula (1), Rf of the formula (2a), Rfa of the formula (2b) and/or R of the formula (2c). Additionally there can be employed a process for post-modification by reacting a compound having a crosslinkable functional group.

The crosslinking agent may be selected from polyfunctional compounds having, in one molecule thereof, two or more crosslinkable functional groups mentioned above.

Examples of the crosslinking agent are, for instance,

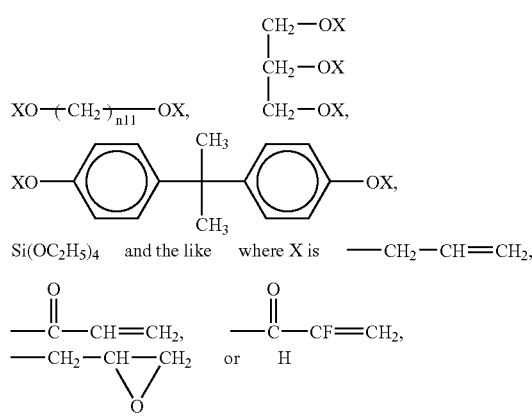

n11 is an integer of 1 to 8, and because a crosslinking reaction is good and enhancement of a mechanical strength is excellent, preferable are:

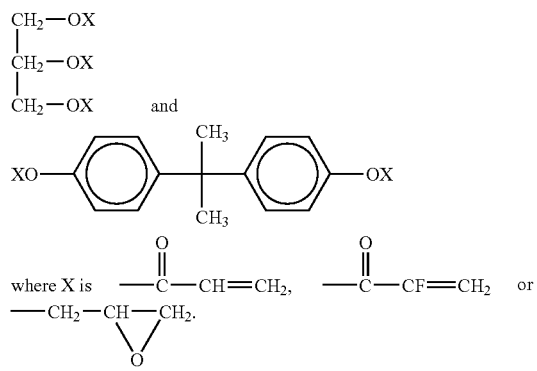

Additionally crosslinking agents described in JP-A-2002-100405, JP-A-9-48832, JP-A-2002-279826, etc. can also be used.

The crosslinking may be carried out by a known crosslinking system suitable for a combination of the crosslinkable functional group and the crosslinking agent.

Next, the electrolyte (II) which is another component of the ion conductor of the present invention is explained.

Examples of the electrolyte (II) usable in the present invention are known metal salts, ionic liquids, inorganic polymer type salts, organic polymer type salts, and the like.

There are particularly suitable compounds as the electrolyte depending on an object of the ion conductor. Raised next are examples of electrolytes classified by applications of the ion conductor, but the electrolyte is not limited to them. Also in other applications, the electrolytes exemplified below can be optionally used.

First, various organic metal salts of a boron anion type, an oxygen anion type, a nitrogen anion type, a carbon anion type and a phosphorous anion type can be used as a metal salt for a solid electrolyte for a lithium secondary battery, and an oxygen anion type and a nitrogen anion type can be used preferably.

Specifically $CF_3SO_3Li$, $C_4F_9SO_3Li$, $C_8F_{17}SO_3Li$, $CH_3SO_3Li$, $C_6H_5SO_3Li$, $LiSO_3C_2F_4SO_3Li$, $CF_3CO_2Li$, $C_6H_5CO_2Li$, $Li_2C_{4L\ O4}$ and the like may be used as a metal salt of oxygen anion type, and it is particularly preferable to use $CF_3SO_3Li$, $C_4F_9SO_3Li$ and $C_8F_{17}SO_3Li$.

Examples of a metal salt of nitrogen anion type to be used are $(CF_3SO_2)_2NLi$ (TFSI), $(C_2F_5SO_2)_2NLi$ (BETI), $(CF_3SO_2)(C_4F_9SO_2)NLi$, $(CF_3SO_2)(C_8F_{17}SO_2)NLi$, $(CF_3CO)_2NLi$, $(CF_3CO)(CF_3CO_2)NLi$, $((CF_3)_2CHOSO_2)_2NLi$, $(C_2F_5CH_2OSO_2)_2NLi$ and the like, and it is particularly preferable to use $(CF_3SO_2)_2NLi$ (TFSI) and $(C_2F_5SO_2)_2NLi$ (BETI).

Metal salts which can be used as an inorganic metal salt are $LiPF_6$, $LiBF_4$, $LiAsF_6$, $LiClO_4$ and the like, and it is particularly preferable to use $LiPF_6$ and $LiBF_4$.

Examples of an organic metal salt for a solid electrolyte for capacitors are $Et_4NBF_4$ (Et denotes ethylene, hereinafter the same), $Et_4NClO_4$, $Et_4NPF_6$, $Et_4NAsF_6$, $Et_4NCF_3SO_3$, $Et_4N(CF_3SO_2)_2N$ and $Et_4NC_4F_9SO_3$, and it is particularly preferable to use $Et_4NBF_4$ and $Et_4NPF_6$.

Metal salts which can be used as an inorganic metal salt are $LiPF_6$, $LiBF_4$, $LiAsF_6$, $LiClO_4$, $NaPF_6$, $NaBF_4$, $NaAsF_6$, $NaClO_4$, $KPF_6$, $KBF_4$, $KAsF_6$, $KClO_4$ and the like, and it is particularly preferable to use $LiPF_6$, $LiBF_4$, $NaPF_6$ and $NaBF_4$.

Examples of metal salts for a solid electrolyte for a dye sensitizing solar cell are $R^{1a}R^{2a}R^{3a}R^{4a}NI$ ($R^{1a}$ to $R^{4a}$ are the same or different, and each is an alkyl group having 1 to 3 carbon atoms), LiI, NaI, KI,

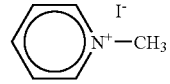

and the like.

When an ionic liquid is used as the electrolyte (II), examples of a solid electrolyte for lithium secondary batteries, capacitors and dye sensitizing solar cells are salts of an organic or inorganic anion with polyalkylimidazolium cation, N-alkylpyridinium cation, tetraalkylammonium cation or tetraalkylphosphonium cation, and particularly preferable is 1,3-dialkylimidazolium salt.

Preferable examples of polyalkylimidazolium cation are 1,3-dialkylimidazolium cations such as 1-ethyl-3-methylimidazolium cation ($EMI^+$) and 1-butyl-3-methylimidazolium cation ($BMI^+$); trialkylimidazolium cation such as 1,2-dimethyl-3-propylimidazolium cation ($DMPI^+$); and the like.

Preferable examples of inorganic anions are, for instance, $AlCl_4^-$, $BF_4^-$, $PF_6^-$, $AsF_6^-$, $I^-$, and the like, and preferable examples of organic anions are, for instance, $CH_3COO^-$, $CF_3COO^-$, $C_3F_7COO^-$, $CF_3SO_3^-$, $C_4H_9SO_3^-$, $(CF_3SO_2)_2N^-$, $(C_2F_5SO_2)_2N^-$ and the like.

Examples thereof are $EMIAlCl_4$, $EMIBF_4$, $EMIPF_6$, $EMIAsF_6$, EMII, $EMICH_3COO$, $EMICF_3COO$, $EMIC_3F_7COO$, $EMICF_3SO_3$, $EMIC_4F_9SO_3$, $EMI(CF_3SO_2)_2N$, $EMI(C_2F_5SO_2)_2N$, $BMIAlCl_4$, $BMIBF_4$, $BMIPF_6$, $BMIAsF_6$, BMII, $BMICH_3COO$, $BMICF_3COO$, $BMIC_3F_7COO$, $BMICF_3SO_3$, $BMIC_4F_9SO_3$, $BMI(CF_3SO_2)_2N$, $BMI(C_2F_5SO_2)_2N$, $DMPIAlCl_4$, $DMPIBF_4$, $DMPIPF_6$, $DMPIAsF_6$, DMPII, $DMPICH_3COO$, $DMPICF_3COO$, $DMPIC_3F_7COO$, $DMPICF_3SO_3$, $DMPIC_4F_9SO_3$, $DMPI(CF_3SO_2)_2N$, $DMPI(C_2F_5SO_2)_2N$ and the like.

Particularly for a solid electrolyte for dye sensitizing solar cells, suitable are iodides such as EMII, BMII and DMPII.

The blended amount of the electrolyte (II) varies depending on required current density, application, kind of the electrolyte, etc., and is preferably not less than 0.1 part by mass based on 100 parts by mass of the high molecular weight ion conducting compound (I), further not less than 1 part by mass, particularly not less than 2 parts by mass, and not more than 200 parts by mass, further not more than 100 parts by mass, particularly not more than 50 parts by mass.

In the present invention, the electrolyte (II) is held by impregnation and dissolution in the non-crystalline fluorine-containing polyether compound (1) constituting the high molecular weight ion conducting compound (I).

For holding the electrolyte (II) in the high molecular weight ion conducting compound (I), there can be employed a method of kneading the electrolyte (II) and the high molecular weight ion conducting compound (I); a method of mixing the high molecular weight ion conducting compound (I) in a solution prepared by dissolving the electrolyte (II) in a solvent and then distilling off the solvent; a method of melting the high molecular weight ion conducting compound (I) by heating and then kneading the electrolyte (II) therewith; or the like method.

In the ion conductor of the present invention, the non-crystalline fluorine-containing polyether compound (1) is in the form of solid but is low in viscosity, and therefore the ionic conductivity is high even as it is. However in the case where the ionic conductivity need be increased further, an aprotic organic solvent (III) may be blended to make a gel electrolyte in the form of gel (plasticized).

Examples of the organic solvent (III) to be used for the gel electrolyte are ethylene carbonate, propylene carbonate, butylene carbonate, γ-butyrolactone, 1,2-dimethoxyethane, tetrahydrofuran, 2-methyltetrahydrofuran, 1,3-dioxolan, 4-methyl-1,3-dioxolan, methyl formate, methyl acetate, methyl propionate, dimethyl carbonate, ethyl methyl carbonate, diethyl carbonate, acetonitrile, dimethyl sulfoxide, methylpyrrolidone and the like. Particularly from the viewpoint of enhancement of a dielectric constant, oxidation resistance and electrochemical stability, ethylene carbonate, propylene carbonate, diethyl carbonate, γ-butyrolactone, 1,2-dimethoxyethane, 1,3-dioxolan and acetonitrile are preferable.

It is preferable to use the organic solvent (III) in such an amount that the solid content in the ion conductor is not less than 10% by mass, further not less than 50% by mass, particularly 100% by mass.

To the ion conductor of the present invention may be blended other additives as case demands. Examples of the other additives are, for instance, metal oxides, glass and the like.

The ion conductor of the present invention is useful for a high molecular weight electrolyte for lithium secondary batteries, a high molecular weight electrolyte for capacitors, and a high molecular weight electrolyte for solar cells (particularly dye sensitizing solar cells) from the viewpoint of a high ionic conductivity and an excellent oxidation resistance and mechanical strength. Additionally the ion conductor of the present invention can be used as an electrolyte for various sensors, an electrolyte for electrochromic devices and an ion conductor to be used for various electrolyses.

EXAMPLES

The present invention is then explained by means of Examples and Comparative Examples, but is not limited to them.

The methods of measurement adopted in the present invention are as follows.

NMR: AC-300 available from BRUCKER CO., LTD. is used.
$^{19}$F-NMR:

Measuring conditions: 282 MHz (trichlorofluoromethane=0 ppm)

$^1$H-NMR:

Measuring conditions: 300 MHz (tetramethylsilane=0 ppm)
GPC:

The number average molecular weight is calculated from the data obtained by measuring by gel permeation chromatography (GPC) by using GPC HLC-8020 available from Toso Kabushiki Kaisha and columns available from Shodex (one GPC KF-801, one GPC KF-802 and two GPC KF-806M are connected in series) and flowing tetrahydrofuran (THF) as a solvent at a flowing rate of 1 ml/min.

TGA:

A 1.0% thermal decomposition temperature ($T_{d1.0}$) is calculated from the data obtained when heating up from room temperature at a rate of 20° C./min by using TG/DTA-6200 available from Seiko Instruments Kabushiki Kaisha.

DSC:

By using DSC (differential scanning calorimeter), in the 1st run, temperature is raised up to 200° C. at a temperature elevating rate of 10° C./min, followed by maintaining at 200° C. for one minute and cooling down to 25° C. at a temperature decreasing rate of 10° C./min, and then a center point of heat absorption curve obtained in the 2nd run of heating at a temperature elevating rate of 10° C./min is assumed to be Tg. The used differential scanning calorimeter is one available from Seiko Instruments Kabushiki Kaisha.

IR:

Measurement is carried out at room temperature with a Fourier-transform infrared spectrophotometer 1760X available from Perkin Elmer Co., Ltd.

Viscosity:

Measurement is carried out by using a VISCONE CV series cone plate type rotational viscometer available from Misec Corporation with a cone having a measurable viscosity range of 50 to 8,000 mPa·s at 94 rpm at 80° C.

Ionic Conductivity:

An ionic conductivity is measured at room temperature at a frequency of $10^4$ Hz to $10^1$ Hz according to AC 4-terminal method. SI1280B available from TOYO Corporation is used as an impedance meter.

Preparation Example 1

(Synthesis of Polymer having Fluorine-Containing Ether Structure in its Side Chain)

Into a 100 ml eggplant type glass flask equipped with a stirrer were poured 20 g of a compound having a fluorine-containing ether in its side chain and represented by the following formula (I-1):

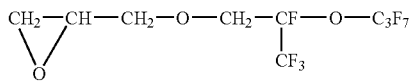

and 1.83 g of 1,3-dioxirane-2-one:

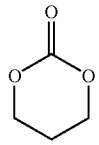

after the inside of the flask was sufficiently replaced with nitrogen.

Then 87 g of HCFC141b/chloroform (80/20: volume ratio) was added thereto, and 0.065 ml of $BF_3.OEt_2$ was added dropwise at 0° C. in a nitrogen gas stream, followed by 24-hour stirring. After completion of a reaction, HCFC141b/chloroform was distilled off, and the obtained liquid was poured into hexane for separation. Then the obtained liquid was poured into pure water for separation, followed by vacuum drying to obtain 4.8 g of a colorless transparent polymer. According to $^{19}$F-NMR and $^1$H-NMR analyses, the polymer was found to be a polymer comprising the unit (I-1) having a fluorine-containing ether at an end of its side chain and the unit of 1,3-dioxirane-2-one at the percent by mole ratio of 74/26. Also the number average molecular weight measured by a GPC analysis using tetrahydrofuran (THF) as a solvent was 1,637, and the weight average molecular weight was 1,881. Further as a result of measurement of TGA and DSC in the air, $Td_{1.0}$ was 119.0° C. and Tg was −62.5° C. Also a stretching vibration of a carbonyl group measured by IR was recognized at 1,751.7 $cm^{-1}$ and 1,805.1 $cm^{-1}$.

$^{19}$F-NMR: ($CD_3COCD_3$): −80.2 to −81.0 ppm (1F), −81.0 to −81.7 ppm (3F), −81.7 to −82.5 ppm (3F), −82.5 to −84.3 ppm (1F), −128.9 to −130.4 ppm (2F), −132.3 to −134.1 ppm (1F)

$^1$H-NMR: ($CD_3COCD_3$): 1.8 to 2.2 ppm (2H), 3.3 to 4.8 ppm (24H)

The viscosity of this polymer measured with a cone plate type rotational viscometer was 9.2 mPa·s.

Example 1

To the polymer obtained in Preparation Example 1 was dissolved $LiClO_4$ as an electrolyte in a super-saturated amount, followed by allowing to stand overnight in a 6 ml sample bottle. After allowing to stand overnight, a transparent polymer phase was precipitated in an upper layer, and a solid was precipitated in a lower layer. The upper layer was taken out, and after forming a rectangular film, an ionic conductivity was measured. The ionic conductivity was $4.8 \times 10^{-3}$ S/cm.

Preparation Example 2

(Synthesis of Polymer having Fluorine-containing Ether Structure in its Side Chain)

After sufficiently replacing the inside of a 100 ml eggplant type glass flask equipped with a stirrer with nitrogen, 7.4 g of a compound having a fluorine-containing ether in its side chain and represented by the following formula (I-2):

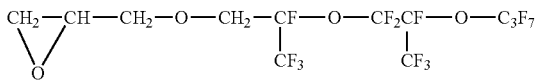

and 0.48 g of 1,3-dioxirane-2-one:

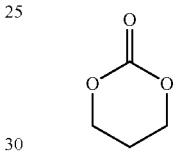

were poured into the flask.

Then 40 g of HCFC141b/chloroform (80/20: volume ratio) was poured into the flask and 0.017 ml of $BF_3.OEt_2$ was added thereto dropwise at 0° C. in a nitrogen gas stream, followed by stirring for 24 hours. After completion of a reaction, HCFC141b/chloroform was distilled off, and the obtained liquid was poured into hexane for separation. Then the obtained liquid was poured into pure water for separation, followed by vacuum drying to obtain 4.7 g of a colorless transparent polymer. According to $^{19}$F-NMR and $^1$H-NMR analyses, the polymer was found to be a polymer comprising the unit (I-2) having a fluorine-containing ether at an end of its side chain and the unit of 1,3-dioxirane-2-one at the percent by mole ratio of 85/15. Also the number average molecular weight measured by a GPC analysis using tetrahydrofuran (THF) as a solvent was 1,981, and the weight average molecular weight was 2,184. Further as a result of measurement of TGA and DSC in the air, $Td_{1.0}$ was 118.8° C. and Tg was −66.5° C. Also a stretching vibration of a carbonyl group measured by IR was recognized at 1,752.3 $cm^{-1}$ and 1,825.9 $cm^{-1}$.

$^{19}$F-NMR: ($CD_3COCD_3$): −79.7 to −80.4 ppm (3F), −80.9 to −81.3 ppm (2F), −81.3 to −81.9 ppm (5F), −82.2 to −83.8 ppm (3F), −128.9 to −130.5 ppm (2F), −132.0 to −134.0 ppm (1F), −144.0 to −146.0 ppm (1F)

$^1$H-NMR: ($CD_3COCD_3$): 1.7 to 2.0 ppm (2H), 3.2 to 4.4 ppm (44.6H)

The viscosity of this polymer measured with a cone plate type rotational viscometer was 45.4 mPa·s.

Example 2

To the polymer obtained in Preparation Example 2 was dissolved $LiClO_4$ as an electrolyte in a super-saturated amount, followed by allowing to stand overnight in a 6 ml sample bottle. After allowing to stand overnight, a transparent polymer phase was precipitated in an upper layer, and a solid was precipitated in a lower layer. The upper layer was taken out, and after forming a rectangular film, an ionic conductivity was measured. The ionic conductivity was $1.2 \times 10^{-3}$ S/cm.

Preparation Example 3

(Synthesis of Polymer having Trifluoromethyl Group in its Side Chain: for Comparison)

After sufficiently replacing the inside of a 100 ml eggplant type glass flask equipped with a stirrer with nitrogen, 0.19 g of $CH_3ONa$ and 70 g of dimethylformamide were added in a nitrogen gas stream, followed by 15-minute stirring at room temperature. After completion of the stirring, 20 g of the following compound (I-3) having a trifluoromethyl group in its side chain:

was added dropwise at 0° C. into the reaction solution, followed by stirring overnight at 40° C. Then 5.0 g of $CH_3I$ was added, and after 15-minute stirring, the reaction solution was poured into pure water. The liquid separated in the lower layer was extracted using HCFC141b. After drying of the extracted solution with $MgSO_4$, HCFC141b was distilled off, and the obtained highly viscose liquid was subjected to vacuum drying to obtain 12.3 g of a colorless transparent homopolymer of the above compound (I-3). This polymer was subjected to $^{19}F$-NMR and $^{1}H$-NMR analyses. Also the number average molecular weight measured by a GPC analysis using tetrahydrofuran (THF) as a solvent was 5,830, and the weight average molecular weight was 8,567. Further as a result of measurement of TGA and DSC in the air, $Td_{1.0}$ was 163.4° C. and Tg was −34.5° C.

$^{19}F$-NMR: ($CD_3COCD_3$): −73.2 to −76.7 ppm (3F)
$^{1}H$-NMR: ($CD_3COCD_3$): 3.5 to 4.1 ppm (1H), 4.1 to 4.2 ppm (1H), 4.2 to 4.5 ppm (1H)

The viscosity of this polymer measured with a cone plate type rotational viscometer was 137 mPa·s.

Comparative Example 1

To the polymer obtained in Preparation Example 3 was dissolved $LiClO_4$ as an electrolyte in a super-saturated amount, followed by allowing to stand overnight in a 6 ml sample bottle. After allowing to stand overnight, a transparent polymer phase was precipitated in an upper layer, and a solid was precipitated in a lower layer. The upper layer was taken out, and after forming a rectangular film, an ionic conductivity was measured. The ionic conductivity was $2.4 \times 10^{-8}$ S/cm.

Comparative Example 2

With respect to a polyethylene oxide having a weight average molecular weight of 4,000, a viscosity and ionic conductivity thereof were measured. The viscosity was 148 mPa·s and the ionic conductivity was $7.5 \times 10^{-8}$ S/cm.

Example 3

To a mixture of 2 g of the polymer obtained in Preparation Example 2 and 0.2 g of propylene carbonate was dissolved $LiClO_4$ as an electrolyte in a super-saturated amount, followed by allowing to stand overnight in a 6 ml sample bottle. After allowing to stand overnight, a transparent polymer mixture phase was precipitated in an upper layer, and a solid was precipitated in a lower layer. The upper layer was taken out, and after forming a rectangular film, an ionic conductivity was measured. The ionic conductivity was $9.2 \times 10^{-3}$ S/cm.

INDUSTRIAL APPLICABILITY

The high molecular weight ion conductor of the present invention itself has a high ionic conductivity even at a temperature near room temperature, is low in a viscosity, is non-flammable and is excellent in oxidation resistance, and can satisfy properties required for high molecular weight electrolytes for lithium batteries, capacitors and solar cells.

The invention claimed is:

1. An ion conductor comprising an ion conducting compound (I) and an electrolytic salt (II), said ion conducting compound being a non-crystalline fluorine-containing polyether compound or a crosslinked product thereof in which said compound has a fluorine-containing group in its side chain and is represented by the formula (1):

$$A\text{-}(D)\text{-}B \quad (1)$$

wherein D is represented by the formula (2):

$$\text{-}(D1)_n\text{-}(FAE)_m\text{-}(AE)_p\text{-}(Y)_q \quad (2)$$

where D1 is a an ether unit having a fluoroether group in its side chain and represented by the formula (2a):

where Rf is a fluoroether group which may have a crosslinkable functional group; $R^1$ is a group or bond bonding Rf to a trunk chain;

FAE is an ether unit having a fluorine-containing alkyl group in its side chain and represented by the formula (2b):

where Rfa is a fluorine-containing alkyl group which may have a crosslinkable functional group;
$R^1$ is a group or bond bonding Rfa to the trunk chain;
AE is an ether unit represented by the formula (2c):

where R is hydrogen atom, an alkyl group which may have a crosslinkable functional group, an aliphatic cyclic hydrocarbon group which may have a crosslinkable functional group or an aromatic hydrocarbon group which may have a crosslinkable functional group; $R^1$ is a group or bond bonding R to the trunk chain;

Y is a unit having at least one of the formulae (2d-1) to (2d-3):

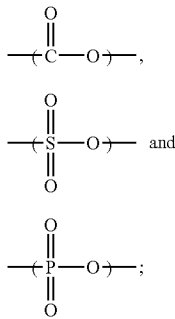

n is an integer of 1 to 200; m is 0 or an integer of 1 to 200; p is 0 or an integer of 1 to 10,000; q is an integer of 1 to 100; the order of bonding of D1, FAE, AE and Y is not specified;

A and B are the same or different and each is hydrogen atom, an alkyl group which may have fluorine atom and/or a crosslinkable functional group, a phenyl group which may have fluorine atom and/or a crosslinkable functional group, —COOH group, —OR² where R² is hydrogen atom or an alkyl group which may have fluorine atom and/or a crosslinkable functional group, an ester group or a carbonate group (when an end of D is oxygen atom, A and B are not a —COOH group, —OR², an ester group and a carbonate group).

2. The ion conductor of claim 1, wherein in said formula (2a), —Rf is represented by the formula (2a-1):

—Rf¹—X          (2a-1)

wherein —Rf¹- is a fluoroether unit having at least one kind selected from the group consisting of —(OCF₂CF₂CF₂)$_{n1}$—, —(CF₂CF₂CF₂O)$_{n1}$—, —(OCFZ¹CF₂)$_{n1}$—, —(OCF₂CFZ¹)$_{n1}$-, —(OCFZ²)$_{n1}$-, —(CFZ²O)$_{n1}$—, —(OCH₂CF₂CF₂)$_{n1}$—, —(OCF₂CF₂CH₂)$_{n1}$—, —(OCH₂CH₂CF₂)$_{n1}$—, —(OCF₂CH₂CH₂)$_{n1}$—, —(OCF₂CF₂CF₂CF₂)$_{n1}$—, —(CF₂CF₂CF₂CF₂O)$_{n1}$—, —(OCFZ²CH₂)$_{n1}$—, —(CH₂CFZ²O)$_{n1}$—, —(OCH(CH₃)CF₂CF₂)$_{n1}$—, —(OCF₂CF₂CH(CH₃))$_{n1}$—, —(CFZ¹CF₂O)$_{n1}$—, —(CH₂CF₂CF₂O)$_{n1}$—, —(OCZ³₂)$_{n1}$- and —(CZ³₂O)$_{n1}$— where Z¹ and Z² may be the same or different and each is H, F or CF₃; Z³ is CF₃; n1 is an integer of 1 to 3; X is at least one kind selected from hydrogen atom, halogen atom or a fluorine-containing alkyl group which has 1 to 20 carbon atoms and may have an ether bond and/or a crosslinkable functional group, and X does not have said Rf¹ and a —O—O— structure is not contained in the Rf¹.

3. The ion conductor of claim 2, wherein in said formulae (2a), (2b) and (2c), R¹ is a bonding group represented by the formula:

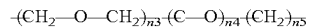

wherein n3 is 0 or 1, n4 is 0 or 1, n5 is 0 or an integer of 1 or 2.

4. The ion conductor of claim 2, wherein said unit Y is a unit containing the formula (2d-1).

5. The ion conductor of claim 2, which further contains an organic solvent (III).

6. The ion conductor of claim 1, wherein in said formula (2a), —Rf is a fluoroether group represented by the formula (2a-2):

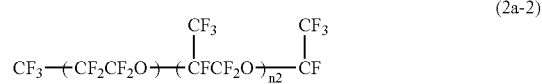

wherein n2 is 0 or an integer of 1 or 2.

7. The ion conductor of claim 6, wherein in said formulae (2a), (2b) and (2c), R¹ is a bonding group represented by the formula:

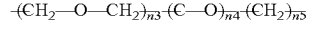

wherein n3 is 0 or 1, n4 is 0 or 1, n5 is 0 or an integer of 1 of 2.

8. The ion conductor of claim 6, wherein said unit Y is a unit containing the formula (2d-1).

9. The ion conductor of claim 6, which further contains an organic solvent (III).

10. The ion conductor of claim 1, wherein in said formulae (2a), (2b) and (2c), R¹ is a bonding group represented by the formula:

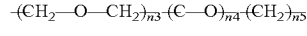

wherein n3 is 0 or 1, n4 is 0 or 1, n5 is 0 or an integer of 1 or 2.

11. The ion conductor of claim 1, wherein said unit Y is a unit containing the formula (2d-1).

12. The ion conductor of claim 1, which further contains an organic solvent (III).

13. An electrolyte comprising the ion conductor of claim 1.
14. An electrolyte comprising the ion conductor of claim 2.
15. An electrolyte comprising the ion conductor of claim 6.

* * * * *